United States Patent
Nadeau et al.

(10) Patent No.: US 6,942,056 B2
(45) Date of Patent: Sep. 13, 2005

(54) SAFETY DEVICE FOR LIFTING A BONNET OF A MOTOR VEHICLE IN THE EVENT OF A COLLISION

(75) Inventors: Jean-Paul Nadeau, Ollioules (FR); Laurent D'Emmanuelle, Toulon (FR); Eric Laspesa, Six Fours (FR); Evrard Borg, Sanary (FR)

(73) Assignee: Pyroalliance, Les Mureaux (FR)

( * ) Notice: Subject to any disclaimer, the term of this patent is extended or adjusted under 35 U.S.C. 154(b) by 0 days.

(21) Appl. No.: 10/722,440

(22) Filed: Nov. 28, 2003

(65) Prior Publication Data

US 2004/0134705 A1 Jul. 15, 2004

(30) Foreign Application Priority Data

Dec. 20, 2002 (FR) .............................. 02 16346

(51) Int. Cl.[7] .................... B60R 21/34; B62D 25/10; B62D 25/12
(52) U.S. Cl. .................... 180/274; 180/69.21
(58) Field of Search .............. 180/274, 69.21; B60R 21/34; B62D 25/10, 25/12

(56) References Cited

U.S. PATENT DOCUMENTS

| | | | | |
|---|---|---|---|---|
| 3,811,701 A | * | 5/1974 | Grime | 280/753 |
| 5,358,275 A | * | 10/1994 | Fohl | 280/806 |
| 5,967,573 A | * | 10/1999 | Wang | 293/119 |
| 6,039,353 A | * | 3/2000 | Bauer et al. | 280/806 |
| 6,076,856 A | * | 6/2000 | Wang et al. | 280/806 |
| 6,283,508 B1 | * | 9/2001 | Nouwynck et al. | 280/753 |
| 6,302,458 B1 | * | 10/2001 | Wang et al. | 293/132 |
| 6,439,330 B1 | | 8/2002 | Paye | |
| 6,641,166 B2 | * | 11/2003 | Browne et al. | 280/752 |
| 2002/0026685 A1 | | 3/2002 | Bjureblad et al. | |
| 2003/0001372 A1 | * | 1/2003 | Browne et al. | 280/751 |

FOREIGN PATENT DOCUMENTS

| | | |
|---|---|---|
| DE | 199 57 872 A1 | 6/2001 |
| DE | 101 16 716 A1 | 10/2002 |
| EP | 0 509 690 A1 | 10/1992 |
| GB | 2 373 218 A | 9/2002 |
| JP | A 11-20741 | 1/1999 |
| JP | A 11-310158 | 11/1999 |
| JP | 202 16 240 U1 | 4/2003 |
| WO | WO 00/69703 | 11/2000 |

\* cited by examiner

*Primary Examiner*—Paul N. Dickson
*Assistant Examiner*—Joselynn Y. Sliteris
(74) *Attorney, Agent, or Firm*—Oliff & Berridge, PLC

(57) ABSTRACT

A safety device for lifting a bonnet of a motor vehicle in the event of a collision, the device being situated under the bonnet. The device includes a mechanism for lifting the bonnet, and a gas generator. The bonnet includes a structure allowing the bonnet in normal operation, to be opened or closed about a rotation axis. The device also includes an actuator with a mechanical means actuated using the gas generator and able to deploy the lifting mechanism.

12 Claims, 3 Drawing Sheets

SAFETY DEVICE FOR LIFTING A BONNET OF A MOTOR VEHICLE IN THE EVENT OF A COLLISION

BACKGROUND OF THE INVENTION

The technical field of the invention is that of devices that are used in the field of automotive safety to protect a pedestrian in the event of a head-on impact between the said pedestrian and a motor vehicle.

When a pedestrian is struck by the front of a motor vehicle it is common for the pedestrian's head to come into direct contact with the bonnet of the vehicle. This impact between the head and the bonnet causes the bonnet to deform. This deformation often goes so far as to bring the bonnet into contact with the engine block situated just underneath. The movement of the pedestrian's head is then brought to an abrupt halt by the bonnet coming into contact with the engine block and therefore experiences violent deceleration that may cause the pedestrian serious injury.

The prior art knows devices that, in the event of an impact between a pedestrian and a motor vehicle, allow the vehicle bonnet to be lifted by a certain amount so as to prevent the pedestrian's limbs and particularly his/her head from being brought to a halt, during the impact with the bonnet, by the engine block situated just under the bonnet. In the devices of the prior art, the lifting of the bonnet is performed at the rear of the bonnet, that is to say at the opposite end to the end used for opening or closing the bonnet during normal operation thereof, the bonnet remaining fixed at the front of the motor vehicle.

Patent Application EP 0 509 690 describes such a device. This device is entirely mechanical and comprises, in a first embodiment, pivoting arms allowing the bonnet to be lifted to increase the space between the bonnet and the engine block. The pivoting of the arms is obtained by moving the bonnet backwards. In the event of a head-on collision between a vehicle equipped with such a device and a pedestrian, the impact of the pedestrian with the bonnet causes a backwards translational movement of the bonnet, this translational movement being accompanied, with the aid of the pivot arms, by the lifting of the bonnet.

Patent Application WO 00/69703 also describes a mechanical device for protecting pedestrians in the event of an impact with the bonnet of a motor vehicle. This device comprises two roughly parallel arms used for opening and closing the bonnet during normal operation. At least one of these arms has a length that can vary according to the impact of the pedestrian with the bonnet. Impact with the bonnet lengthens the arm and therefore moves the bonnet away from the engine block.

These two patent applications disclose mechanical devices which are triggered when the pedestrian is in impact with the bonnet. In the first application, it is the rearwards translational movement of the bonnet, caused by the impact of the pedestrian with the bonnet, which triggers the lifting device. The pedestrian's head may therefore very well have already struck the bonnet when the bonnet-lifting device is triggered. In the second application, the impact has also already occurred when the device is actuated because the arm varies in length according to the impact of the pedestrian with the bonnet. The devices disclosed in these two applications are therefore slow and are not in any way capable of anticipating the impact of the pedestrian with the bonnet.

Patent Application GB 2 373 218 describes a device allowing the bonnet of a motor vehicle to be lifted in the event of a collision. This device comprises a structure that can be inflated using a gas generator. This structure is made of a plastically deformable material. In this device, the gas generator is coupled to a collision detector making it possible, unlike the case with the two devices described in the above two applications, to lift the bonnet very early, that is to say as the vehicle strikes the pedestrian. In this case, the bonnet is already lifted when, for example, the pedestrian's head strikes the bonnet. In such a device, it is necessary for the gas generator to be placed directly under the inflatable structure so that quick and immediate inflation of the structure can be achieved. Installing such a device will therefore entail having a significant amount of space available under the bonnet of the motor vehicle. Now, the free space in a vehicle is something that is becoming increasingly rare because, in particular, of the proliferation of devices, particularly electronic devices. In addition, this device, once used, will need to be replaced in its entirety.

Document U.S. Pat. No. 6,439,330 describes a device for lifting the bonnet of a motor vehicle. This device comprises a lifting assembly, endowed with an arm mounted to rotate at one of its ends with a leg secured to the bonnet. The second end of the arm is secured to a rotation axis mounted on a rail and able to slide along the said rail. A pyrotechnic actuator comprises a rod the end of which is mounted to rotate on the said rotation axis. Extraction of the rod under the action of the gases generated in the actuator therefore causes the translational movement of the axis along the rail, thus causing the bonnet to be lifted. The device described also has a locking device whose purpose is to immobilize the lifting assembly when the latter is at rest and therefore to prevent the bonnet from being lifted.

A device as described in this last American patent combines, in order to obtain the lifting of the bonnet, a translational movement and a rotational movement of its lifting assembly. Such kinematics therefore entails the use of a special component, in this instance that of a rail, to obtain the translational movement of the end of the arm.

Document DE 199 57 872 also discloses a device for lifting a bonnet of a motor vehicle. According to a first configuration, this device comprises a link rod mounted to rotate at its two ends with, on the one hand, at its first end, the bonnet of the vehicle and, on the other hand, at its second end, a deformable element secured to the vehicle. A pyrotechnic actuator comprises a rod the end of which is pivot-mounted at a point situated more or less at the middle of the link rod. This pyrotechnic actuator is placed under the link rod in such a way that, when it is actuated, its rod is deployed vertically to cause the link rod to pivot. In the event of an impact with a pedestrian, the deployment of the rod therefore causes the link rod to pivot about the axis situated at its second end. When the link rod has pivoted, the impact produced by the pedestrian with the bonnet causes the link rod to rock about its central point, this rocking of the link rod being allowed by virtue of the deformation of the deformable element.

According to a second configuration of this device, the link rod, at its second end, is fixed directly to the vehicle. In the event of an impact of the pedestrian with the bonnet, the link rod does not rock in pivoting about its central point where the rod is fixed, but twists on its part situated between its central point and its first end.

Such a device, unlike the one described in American document U.S. Pat. No. 6,439,330, makes it possible to get around the use of a rail in order to achieve the lifting of the bonnet. In addition, such a device uses simple operating kinematics because the lifting is obtained solely by the rotation of the link rod. However, it does not use any locking device to prevent the bonnet from being opened. In addition, in such a device, the lifting of the bonnet is performed fully and directly by the actuator rod. The force that has to be generated in order to lift the bonnet has therefore to be very high and therefore entails the use of a significant amount of pyrotechnic substance. The use of such a device may therefore prove cumbersome and bulky.

SUMMARY OF THE INVENTION

The object of the invention is therefore to obtain a safety device that can be actuated in the event of an impact of a motor vehicle with a pedestrian, which has simple operating kinematics while at the same time exhibiting a locking device, which is not very cumbersome, which can easily be housed under the bonnet, and which, once used, can be left in place, at least in part, under the bonnet so that it can be reused.

This object is achieved by a safety device for lifting a bonnet of a motor vehicle in the event of a collision, the said bonnet comprising a structure allowing it, in normal operation, to be opened or closed about an axis known as the rotation axis, the device being situated under the said bonnet and comprising a mechanism for lifting the said bonnet, an actuator actuated using a gas generator and a device for locking the said lifting mechanism, the said lifting mechanism comprising a link rod, the said device being characterized in that the actuator is able to cause a translational movement of the lifting mechanism in order to unlock it, followed by a rotation of the link rod of the said mechanism in order to deploy the said lifting mechanism.

The locking device makes it possible to keep the locking mechanism at rest and therefore not to disrupt the normal operation of opening or closing the bonnet.

After use of the safety device according to the invention, only the spent gas generator will need to be replaced. The safety device according to the invention, if not damaged during the collision, can be kept as it is under the bonnet of the motor vehicle.

According to one feature, the safety device can be fitted onto the structure used for the normal operation of the bonnet. Thus, the safety device according to the invention may be installed easily on any type of vehicle at low cost without there being a need to make radical modifications to the normal bonnet-operating mechanism.

According to another feature, the mechanism for lifting the bonnet is articulated about the rotation axis of the bonnet. Thus, according to the invention, the case is one of making direct use of the rotation axis of the bonnet in the articulation of the lifting mechanism of the safety device according to the invention.

According to another feature, the device for locking the lifting mechanism consists of two complementary shapes able to collaborate with one another to lock the lifting mechanism, one of these shapes being secured to the lifting mechanism and the other to a part that is fixed with respect to the vehicle.

According to the invention, the unlocking of the lifting mechanism is obtained by first of all bringing about a translational movement of the lifting mechanism so as to separate the two complementary shapes of the locking device. According to the invention, it is thus the same actuator that unlocks the lifting mechanism and that allows it to be deployed to allow the bonnet to be lifted. According to the invention, the unlocking and deployment of the lifting mechanism are performed one after the other in a continuous movement exerted by the actuator on the lifting mechanism.

According to another feature, the link rod is pivot-mounted at one of its ends about an axis known as the pivot axis which is fixed with respect to the vehicle and is articulated at its other end to the bonnet about the rotation axis of the bonnet. The bonnet can therefore pivot about two distinct axes and be lifted in two opposite directions. The lifting mechanism according to the invention is articulated about these two rotation axes. According to the invention, once the lifting mechanism has undergone its translational movement in order to unlock it, the actuator drives the link rod in rotation about its pivot axis. Contrary to the teaching of document U.S. Pat. No. 6,439,330, deployment of the mechanism, and therefore the lifting of the bonnet, are obtained solely by rotation of the link rod about a fixed axis.

According to another feature, the link rod is slideably mounted at each of its ends with respect to, on the one hand, the rotation axis and, on the other hand, the pivot axis. The translational movement of the lifting mechanism is therefore obtained by this special arrangement of the link rod with respect to its two articulation axes. The link rod comprises, for example, two oblong openings directed parallel to its longitudinal axis, in each of which one of its pivot or rotation axes is mounted.

According to another feature, the actuator comprises a piston secured to a rod, the said piston being able to move in a chamber under the action of the gases generated by the gas generator.

According to the invention, the lifting mechanism may be deployed by a thrusting movement or by a pulling movement. According to a preferred embodiment, the gas generator generates gases to extract the rod from the actuator. In this case, the question will be one of exerting thrust in order to deploy the lifting mechanism according to the invention.

The translational movement of the lifting mechanism is therefore performed in the direction of thrust of the actuator rod and by a length long enough to separate the complementary shapes of the locking device. The translational movement of the lifting mechanism continues until a stop is reached and is followed, under the continuous action of the actuator rod, by deployment of the lifting mechanism by rotation of the link rod about its pivot axis.

According to another feature, the rod can be extracted from the actuator in a horizontal direction, the lifting mechanism converting the horizontal movement of the rod into a vertical movement for lifting the bonnet.

According to the invention, it is not necessary for the device according to the invention to be concentrated at one spot under the bonnet. Indeed, the actuator may be sited according to the space available under the bonnet a certain distance away from the lifting mechanism. The length of the actuator rod and the amount of gas to be generated will then have to be tailored to suit.

According to another feature, the safety device comprises means for slowing the return movement of the rod in the chamber of the actuator. That will make it possible to avoid the rod's returning to its initial position and will make it possible to deaden the impact of the pedestrian with the bonnet.

According to another feature, the rod of the actuator is secured to the link rod at a point that is offset with respect to the pivot axis of the said link rod and with respect to the longitudinal axis of the link rod. As the actuator rod is actuated in the extraction direction, this offset point will need to be situated in a horizontal plane below the one containing the pivot axis of the link rod. Thus, the link rod, under the action of the actuator, pivots in the same direction as the bonnet.

According to another feature, the rod comprises an end able to slide in an oblong opening formed on the link rod to cause the link rod to rotate about its pivot axis.

According to another feature, the link rod is made from a deformable material. This characteristic of the link rod will make it possible to perform or contribute to the deadening of the impact of the pedestrian with the bonnet. The link rod may be plastically or elastically deformable.

According to another feature, the actuator is fixed to a deformable support that is fixed with respect to the vehicle. This feature will also make it possible to execute a function of deadening the impact of the pedestrian with the bonnet.

BRIEF DESCRIPTION OF THE DRAWINGS

The invention, with its characteristics and advantages, will become more clearly apparent from reading the description given with reference to the attached drawings in which.

DETAILED DESCRIPTION OF EXEMPLARY EMBODIMENTS

The invention will now be described in conjunction with FIGS. 1 to 6.

In the remainder of the description, the expression "rotation axis" must be understood as representing both the imaginary line about which the rotation takes place and the mechanical component that allows this rotation to take place.

In the remainder of the description, the words "front" and "rear" and the terms "in front of" and "behind" are to be understood with reference to the front and rear of a motor vehicle.

Figure 1:
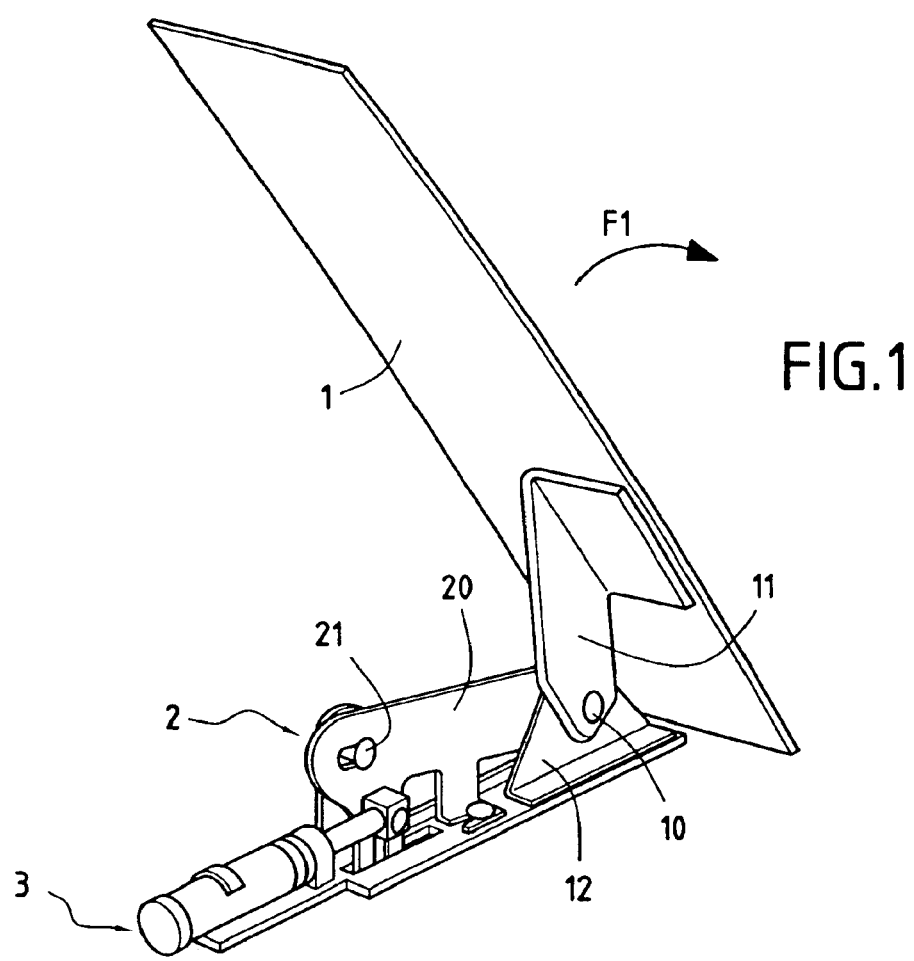
FIG. 1 depicts, in perspective, part of the bonnet of a motor vehicle, opened using its normal opening mechanism, to which the safety device according to the invention is fitted.

With reference to FIG. 1 and in a known way, a bonnet 1 of a motor vehicle is able to be opened or closed by pivoting about a roughly horizontal rotation axis 10 situated towards the rear of the bonnet 1. The bonnet 1 may thus be opened fully to gain access to the engine. In FIG. 1, the bonnet 1 is secured to a lifting leg 11 that pivots about the rotation axis 10 of the bonnet 1.

Figure 2:
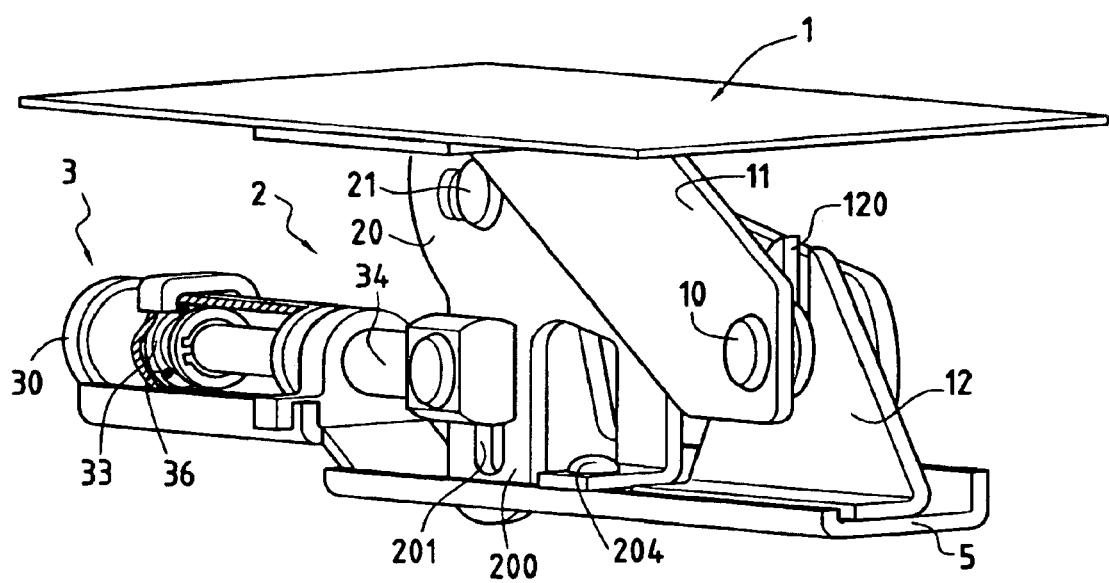
FIG. 2 depicts, in perspective, the safety device according to the invention in its position of rest.

According to the invention, in FIGS. 1 and 2, during normal operation of the bonnet 1, the rotation axis 10 of the bonnet 1 rests in a notch 120 formed in a support 12 fixed on a part 5 that is fixed with respect to the vehicle. The direction in which the bonnet 1 is lifted when opened in normal operation is defined in FIG. 1 by the arrow F1.

With reference to FIGS. 1 to 5, the safety device according to the invention comprises a lifting mechanism 2 consisting of a link rod 20 pivot-mounted at one of its ends, known as its first end, on a part 5 that is fixed with respect to the vehicle and articulated at its opposite end, known as its second end, about the rotation axis 10 of the bonnet 1, with the said lifting leg 11 secured to the bonnet 1. At its first end, the pivot axis 21 of the link rod 20 at its first end is horizontal and parallel to the rotation axis 10 of the bonnet 1. The link rod 20 therefore pivots about this fixed axis 21 in a vertical plane of pivoting. As depicted in FIGS. 1 and 2, at rest, that is to say when the lifting mechanism 2 is folded, the pivot axis 21 of the link rod 20 is in a vertical plane situated forward of the vertical plane to which the rotation axis 10 of the bonnet 1 belongs.

As depicted in FIG. 2, at rest, the lifting mechanism 2 is in a folded position and the rotation axis 10 of the bonnet 1 rests on its support 12. The link rod 20 is in a roughly horizontal position.

According to the invention, deployment of the lifting mechanism 2 is achieved by an actuator 3 fixed to a part 5 that is fixed with respect to the vehicle.

Figure 6:
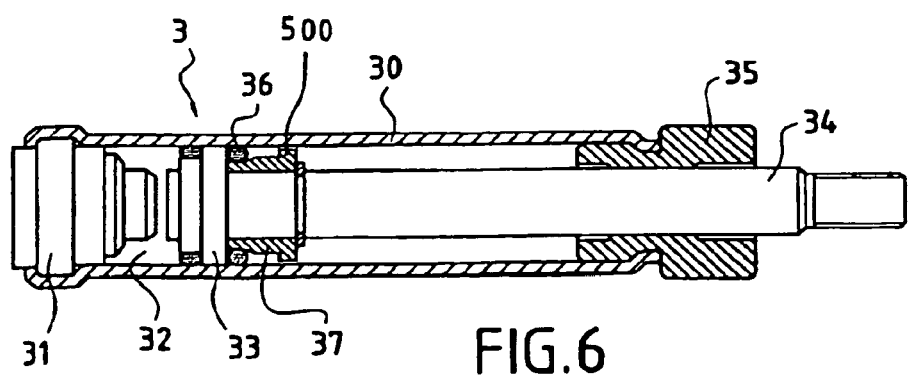
FIG. 6 depicts, in longitudinal section, an actuator used in the safety device according to the invention.

With reference to FIG. 6, this actuator 3 comprises, for example, a cylinder 30 plugged at one end, known as the upstream end, by a gas generator 31. This gas generator 31 has a gas outlet opening into a chamber 32 delimited between the said generator 31 and a piston 33 able to move in the cylinder 30 under the action of the gases generated by the gas generator 31. The piston 33 is secured to a rod 34 guided through a ring 35. This ring 35 is coaxial with the cylinder 30 and fixed to the opposite end to the upstream end of the cylinder 30, known as the downstream end. Under the action of the gases generated by the gas generator 31, the piston 33 moves and the rod 34 deploys or, in other words, is extracted from the cylinder 30 towards the lifting mechanism 2, for example in a roughly horizontal direction. The actuator 3 is placed towards the front relative to the lifting mechanism 2. The rod 34 of the actuator 3 therefore exerts a backwards thrust towards the lifting mechanism 2.

The gas generator 31 used is, for example, a pyrotechnic gas generator 31 comprising, in a known way, an initiator and a pyrotechnic charge that is to be initiated. The gas generator 31 will, for example, be a gas microgenerator such as those used in automotive safety in seatbelt pretensioners. This microgenerator may adopt the form of an electropyrotechnic igniter of the type used in automotive safety to set off the combustion of a pyrotechnic charge contained in a gas generating device to retract a seatbelt. These igniters can therefore be manufactured easily and at low cost. There is therefore no need to resort to gas generators developed specifically for the device according to the invention. This makes it possible to simplify the manufacture of the device according to the invention and reduce its cost.

According to the invention, the actuator 3 comprises a device for slowing the movement of the piston 33 as the rod 34 returns to inside the cylinder 30, this return of the rod 34 being due to the impact of the pedestrian with the bonnet. This slowing device is a system comprising balls 36 housed in part of the piston 33. As the rod 34 returns towards the inside of the cylinder 30, the balls 36 follow a frustoconical profile of the piston 33 and thus come into contact with the interior wall of the cylinder 30. The balls 36 are thus able to slow the piston 33 as the rod 34 returns into the cylinder 30.

This slowing system more particularly comprises an annular component 37 slipped over the rod 34 and resting against the piston 33. This component 37 has an exterior surface following a frustoconical profile and is orientated in such a way that its part of smallest outside diameter is furthest upstream, that is to say rests against the piston 33.

This component 37 also includes an annular protuberance 500 in which an external diameter is approximately equal to an external diameter of the piston 33. In this way, several spaces forming housings are situated between an exterior surface of the component 37 and the inside of the cylinder 30, and delimited by both the piston 33 and the annular protuberance 500, to each receive at least one ball 36. As the rod 34 returns to the inside of the cylinder 30, the balls 36 are extracted from their housing and follow the frustoconical profile of the annular component 37. By following this profile, the balls 36 rub against the interior surface of the wall of the cylinder 30.

According to the invention, the free end of the rod 34, situated on the outside of the actuator 3, is fixed to the mechanism 2 for lifting the bonnet 1. The link rod 20 of the lifting mechanism 2 for example comprises a first leg 200 equipped with an oblong opening 201 formed in a vertical plane, for example in the plane of pivoting of the link rod 20. The free end of the rod 34 is mounted to slide in the said oblong opening 201. When the lifting mechanism 2 is at rest as depicted in FIGS. 1 and 2, the oblong opening 201 is elongate along an axis roughly perpendicular to the direction of thrust of the rod 34 of the actuator 3. The oblong opening 201 is offset with respect to the pivot axis 21 of the link rod 20 and with respect to the longitudinal axis of the link rod. According to the invention, at rest, the connection between the end of the rod 34 and the link rod 20 lies in a horizontal plane below the one containing the pivot axis 21 of the link rod 20.

According to the invention, the mechanism 2 for lifting the bonnet 1 comprises a locking device allowing it to stay in a folded position during normal operation of the bonnet 1. The link rod 20 of the lifting mechanism 2 comprises a second leg 202 running in the plane of pivoting, parallel to the first leg 200 and forming a right angle. The part of the second leg 202 which is perpendicular to the plane of pivoting of the link rod 20 has a notch 203 formed from the back forwards, the two branches of which are intended to trap the shank of a rivet 204 driven into a fixed part of the vehicle so that the branches lie just under the head of the rivet 204. Deployment of the lifting mechanism 2 is therefore prevented by the branches of the notch 203 coming into abutment against the head of the rivet 204.

To unlock the lifting mechanism 2, the link rod 20 can slide in a roughly horizontal direction. For this sliding, the pivot axis 21 of the link rod 20 and the rotation axis 10 of the bonnet 1 are mounted one at the first end and one at the second end of the link rod 20 respectively in an oblong opening 22, 23 the axis of symmetry of which is parallel to the direction of thrust of the rod 34 of the actuator 3.

The way in which the safety device according to the invention works is as follows:

When the bonnet 1 is opened or closed in normal operation, the rotation axis 10 of the bonnet 1 rests in its support 12, to the rear of the bonnet 1, and the lifting leg 11 secured to the bonnet 1 is able to pivot about the rotation axis 10 of the bonnet 1. Opening of the bonnet 1 under normal operation is achieved in the direction defined in FIG. 1 by the arrow F1. The lifting mechanism 2 according to the invention is then folded and locked. At rest, as depicted in FIG. 2, the free end of the rod 34 is situated at the top of the oblong opening 201 of the first leg 200 of the link rod 20, and the pivot axis 21 of the link rod 20 and the rotation axis 10 of the bonnet 1 are as far rearward as they can be in the oblong openings 22, 23 formed at each of the ends of the link rod 20.

Figure 3:
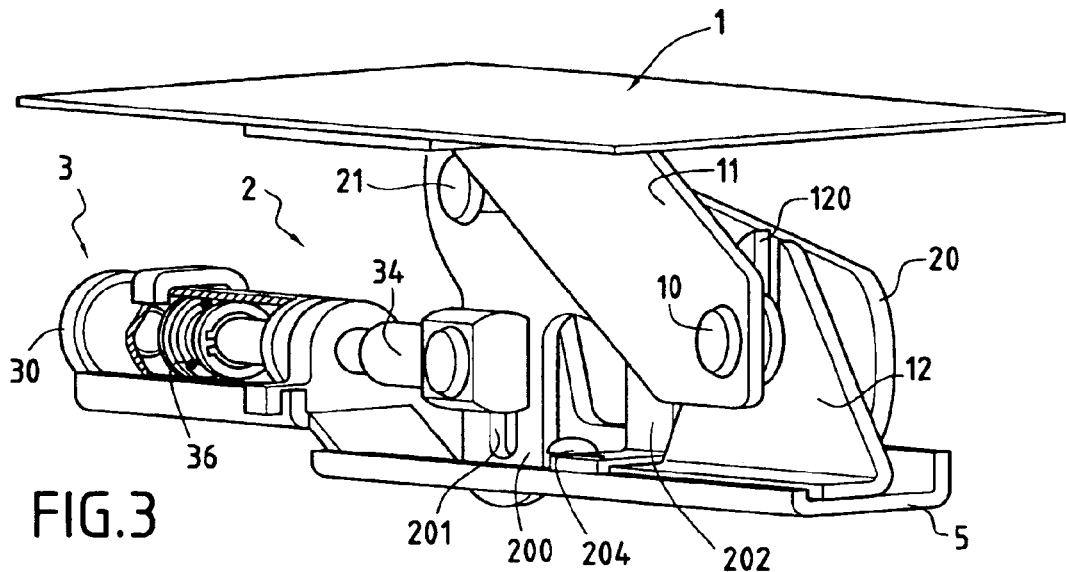
FIG. 3 depicts, in perspective, the safety device according to the invention in the unlocked position.
Figure 4:
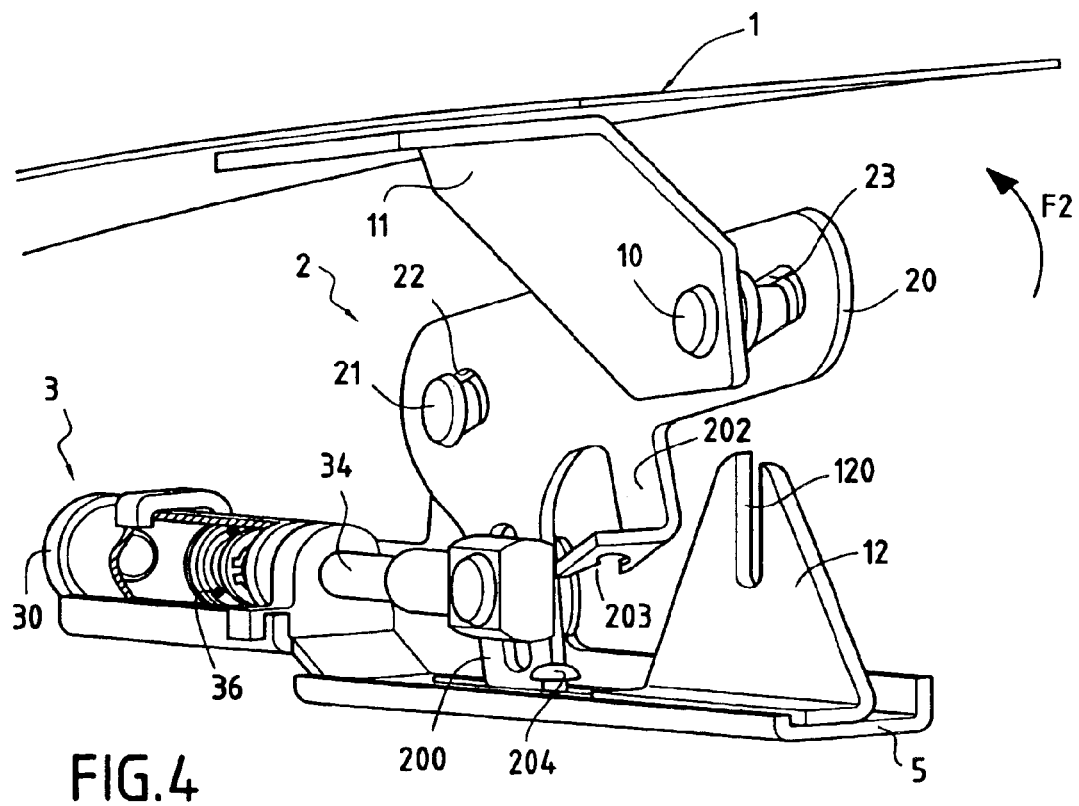
FIG. 4 depicts, in perspective, the safety device according to the invention partially deployed.
Figure 5:
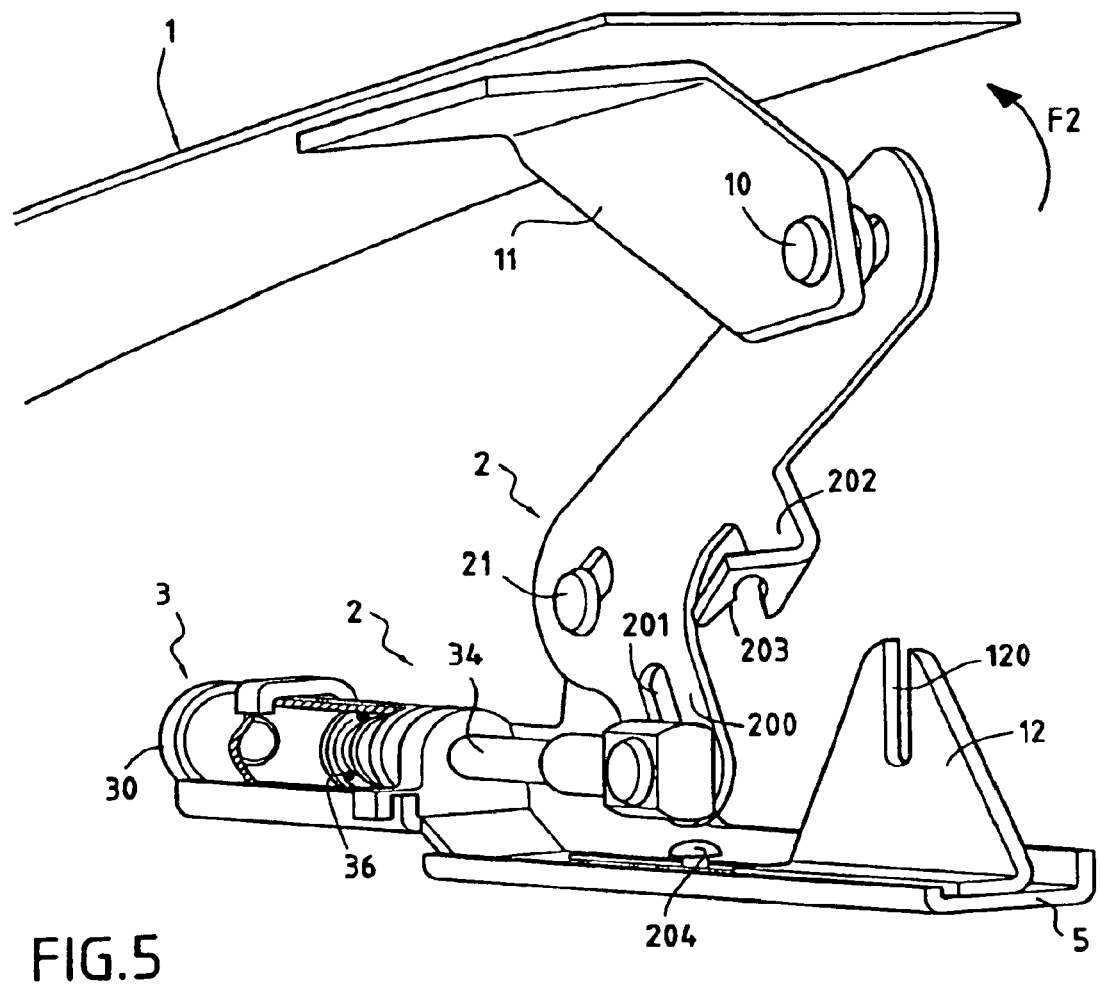
FIG. 5 depicts, in perspective, the safety device according to the invention fully deployed.

When pedestrian impact is detected, for example against the bumper if the detector is placed in the bumper, the safety device according to the invention is activated. A control unit (not depicted) sends a command to the gas generator 31 to cause it to generate the gases required for the operation of the device according to the invention. The gases generated by the gas generator 31 enter the chamber 32 and push the piston 33. The rod 34 secured to the piston 33 slides along the ring 35 and deploys in a roughly horizontal direction. The rod 34 thus exerts backwards thrust, towards the lifting mechanism 2. Deployment of the rod 34 of the actuator 3 by a certain length first of all unlocks the lifting mechanism 2 as depicted in FIG. 3. This unlocking is achieved by a rearwards translational movement of the lifting mechanism 2 and, more specifically, of the link rod, in a direction parallel to the direction of thrust of the rod 34. This translational movement disengages the second leg 202 from the rivet 204 and frees the pivoting movement of the link rod 20. The translational movement of the lifting mechanism 2 is achieved about the oblong openings 22, 23 formed at the two ends of the link rod 20, until the pivot axis 21 of the link rod 20 and the rotation axis 10 of the bonnet 1 each come into abutment against the forwardmost end of the oblong opening 22, 23 in which they are mounted. Once the second leg 202 is disengaged under the effect of the actuator 3, the rod 34 continues to move and under the effect of the thrust sets in motion the link rod 20 which begins to pivot about its pivot axis 21 as depicted in FIG. 4. As it advances, the end of the rod 34 follows the oblong opening 201 formed on the first leg 200 of the link rod 20, making it easier for the link rod 20 to pivot about its pivot axis. The pivoting of the link rod 20 causes extraction of its support 12 from the rotation axis 10 of the bonnet 1. The rotation axis 10 of the bonnet 1 is lifted as the pivoting of the link rod 20 and its pivot axis 21 progresses, and the articulation of the link rod 20 to the lifting leg 11 of the bonnet 1 causes the bonnet 1 to be lifted as depicted in FIG. 5. The bonnet 1 is lifted to a certain height, for example by 80 mm. The extracted length of the rod 34 is of course designed to obtain the deployment of the lifting mechanism 2 and accordingly the lifting of the bonnet 1 to the desired height. The safety device according to the invention therefore allows the bonnet 1 to be lifted in a direction of rotation defined by the arrow F2 in FIGS. 4 and 5 which is the opposite direction of rotation to that of normal opening, defined by the arrow F1 in FIG. 1.

The safety device allows the bonnet to be raised by 80 mm in 30 milliseconds, that is to say in the very short moments after the impact of the pedestrian with the vehicle.

According to the invention, it will be entirely possible, in order to obtain deployment of the lifting mechanism 2, to use an actuator 3 allowing the lifting mechanism 2 to be pulled.

In the event of the impact of a pedestrian with the bonnet 1, the rod 34 retracts into the actuator 3. This return movement of the rod 34 is slowed by the slowing system as described hereinabove. The progressive slowing of the return movement of the rod 34, with the aid of the slowing system involving balls 36, makes it possible to deaden the impact of the pedestrian with the bonnet 1. In order to perform this function of deadening the impact of the pedestrian with the bonnet, other shock-absorbing systems may be used. For example, in an alternative form, the link rod 20 may be made of a plastically or elastically deformable material. Likewise, the actuator 3 may be fixed to a deformable support deadening the return of the rod 34.

According to the invention, two safety devices of the type described hereinabove are installed under the bonnet 1 so as to reduce the force needed to lift the bonnet 1.

According to the invention, the way in which the components of the safety device according to the invention are laid out is dictated in particular by the position of the existing structure for opening and closing the bonnet 1. The safety device according to the invention can be entirely adapted to suit the various configurations that the existing structures for opening and closing the bonnet may adopt, depending on the vehicles. The safety device according to the invention comprises few components, which components can easily be assembled on practically all existing opening or closing systems. According to the invention, the safety device according to the invention may be in the form of a kit that can be fitted to the structure used for normal operation of the bonnet 1.

It should be obvious to those skilled in the art that the present invention allows embodiments in numerous other specific forms without departing from the field of application of the invention as claimed. In consequence, these embodiments are to be considered by way of illustration, but may be modified within the domain defined by the scope of the attached claims, and the invention must not be restricted to the details given hereinabove.

What is claimed is:

1. A safety device for lifting a bonnet of a motor vehicle in the event of a collision, the bonnet comprising a structure allowing the bonnet, in normal operation, to be opened or closed about a rotation axis, the safety device being situated under the bonnet and comprising:

a lifting mechanism that lifts the bonnet, the lifting mechanism including a link rod; and an actuator actuated using a gas generator to deploy the lifting mechanism; and a locking device that locks the lifting mechanism, the actuator causing a translational movement of the lifting mechanism in order to unlock the lifting mechanism, followed by a rotation of the link rod of the lifting mechanism to deploy the lifting mechanism, and the locking device including two complementary shapes cooperating with one another to lock the lifting mechanism, one of the complementary shapes being secured to the lifting mechanism and another of the complementary shapes being secured to a part that is fixed with respect to the vehicle.

2. The safety device according to claim 1, the safety device being fitted onto the structure used for the normal operation of the bonnet.

3. The safety device according to claim 1, the lifting mechanism being articulated about the rotation axis of the bonnet.

4. The safety device according to claim 1, the link rod being pivot-mounted at a first end thereof about a pivot axis which is fixed with respect to the vehicle, and being articulated at a second end thereof, which is fixed with respect to the bonnet, about the rotation axis of the bonnet.

5. The safety device according to claim 4, the link rod being slideably mounted at the first end and the second end with respect to, on the one hand, the rotation axis and, on the other hand, the pivot axis.

6. The safety device according to claim 4, the actuator comprising a piston secured to a rod, the piston movable in a cylinder under an action of gases generated by the gas generator.

7. The safety device according to claim 6, the rod being extracted from the actuator in a horizontal direction, and the lifting mechanism converting a horizontal movement of the rod into a vertical movement for lifting the bonnet.

8. The safety device according to claim 7, further comprising means for slowing a return movement of the rod in the cylinder of the actuator.

9. The safety device according to claim 7, the rod of the actuator being secured to the link rod at a point that is offset with respect to the pivot axis of the link rod, offset with respect to a longitudinal axis of the link rod and situated in a horizontal plane below a plane containing the pivot axis of the link rod.

10. The safety device according to claim 9, the rod comprising an end slideable in an oblong opening formed on the link rod to cause the link rod to rotate about the pivot axis.

11. The safety device according to claim 1, the link rod comprising a deformable material.

12. The safety device according to claim 1, the actuator being fixed to a deformable support that is fixed with respect to the vehicle.

* * * * *